US009327448B2

(12) United States Patent
Shah et al.

(10) Patent No.: US 9,327,448 B2
(45) Date of Patent: May 3, 2016

(54) METHODS FOR FABRICATING THREE-DIMENSIONAL METALLIC OBJECTS VIA ADDITIVE MANUFACTURING USING METAL OXIDE PASTES

(71) Applicant: Northwestern University, Evanston, IL (US)

(72) Inventors: Ramille N. Shah, Chicago, IL (US); Adam E. Jakus, Chicago, IL (US); David C. Dunand, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 14/449,839

(22) Filed: Aug. 1, 2014

(65) Prior Publication Data

US 2015/0035209 A1 Feb. 5, 2015

Related U.S. Application Data

(60) Provisional application No. 61/861,501, filed on Aug. 2, 2013.

(51) Int. Cl.
*B29C 67/00* (2006.01)
*B22F 3/00* (2006.01)
*B22F 3/22* (2006.01)

(52) U.S. Cl.
CPC ............ *B29C 67/0055* (2013.01); *B22F 3/008* (2013.01); *B22F 3/227* (2013.01); *B22F 2201/013* (2013.01)

(58) Field of Classification Search
CPC .................... C04B 35/6565; C04B 2235/652; C04B 2235/6026; C22B 5/00; B29C 67/0055
See application file for complete search history.

(56) References Cited

U.S. PATENT DOCUMENTS

| 5,518,680 | A | 5/1996 | Cima et al. |
| 6,582,651 | B1 * | 6/2003 | Cochran et al. ................... 419/5 |
| 2005/0003189 | A1 | 1/2005 | Bredt et al. |
| 2008/0145639 | A1 * | 6/2008 | Sun et al. ................... 428/304.4 |
| 2010/0279007 | A1 * | 11/2010 | Briselden et al. ............. 427/243 |
| 2011/0064784 | A1 | 3/2011 | Mullens et al. |
| 2011/0196094 | A1 | 8/2011 | Hamad et al. |
| 2015/0037385 | A1 | 2/2015 | Shah et al. |

OTHER PUBLICATIONS

Calvert, Paul, John O'Kelly, and Chad Souvignier. "Solid freeform fabrication of organic-inorganic hybrid materials." Materials Science and Engineering: C 6.2 (1998): 167-174.*

(Continued)

*Primary Examiner* — Russell Kemmerle, III
(74) *Attorney, Agent, or Firm* — Bell & Manning, LLC

(57) ABSTRACT

Methods of forming three-dimensional metallic objects are provided. A metal oxide paste comprising metal oxide particles, a polymeric binder and an organic solvent is extruded through a tip to deposit sequential layers of the metal oxide paste on a substrate to form a three-dimensional metal oxide object. The three-dimensional metal oxide object is exposed to a reducing gas at a temperature and for a period of time sufficient to reduce and to sinter the metal oxide particles to form a three-dimensional metallic object. Depending upon the composition of the metal oxide paste, the three-dimensional metallic object may be composed of a single metal, a simple or complex metal-metal alloy, or a metal-ceramic composite.

21 Claims, 15 Drawing Sheets

(56) References Cited

OTHER PUBLICATIONS

Hong et al., Microstructure and Mechanical Properties of Reticulated Titanium Scrolls, Advanced Engineering Materials, vol. 13, No. 12, 2011, pp. 1122-1127.

Jakus et al., Bioplotted Ceramics and Metals: A Universal Technique for Fabricating Complex, Ordered, and Functional Scaffolds, The 8th Pacific Rim International Congress on Advanced Materials and Processing, Abstract, Aug. 1, 2013.

Kyriakidou et al., Dynamic Co-Seeding of Osteoblast and Endothelial Cells on 3D Polycaprolactone Scaffolds for Enhanced Bone Tissue Engineering, Journal of Bioactive and Compatible Polymers, vol. 23, May 2008, pp. 227-243.

Jakus et al., 3D-Bioplotted Elastic Bone Scaffolds for Tissue Engineering Applications, Poster Presentation, Oral Biology Centennial, University of Chicago, Jun. 19, 2013.

Jakus et al., Bioplotted Elastic Hydroxyapatite-Based Tissue Engineering Scaffolds, Oral Presentation, TMS Pacific Rim International Congress on Advanced Materials and Processing, Waikoloa, HA , Aug. 6, 2013.

Jakus et al., A Single Platform 3D-Printing Approach for Fabricating Tissue Engineering Bio-Scaffolds from Multiple Material Systems, Oral Presentation, Materials Science and Engineering 2013 Hilliard Symposium, Northwestern University, Evanston, May 16, 2013.

Michna et al., Concentrated hydroxyapatite inks for direct-write assembly of 3-D periodic scaffolds, Biomaterials, vol. 26, Apr. 21, 2005, pp. 5632-5639.

Shuai et al., Fabrication of porous polyvinyl alcohol scaffold for bone tissue engineering via selective laser sintering, Biofabrication, vol. 5, No. 015014, Feb. 6, 2013, pp. 1-8.

R. Shah, The Use of 3D Bioplotted Scaffolds and Ultrasonic Stimulation for Tissue Engineering, Oral Presentation, Oral Biology Centennial, University of Chicago, Jun. 19, 2013, slides 1-24.

Yeo et al., Preparation and Characterization of 3D Composite Scaffolds Based on Rapid-Prototyped PCL/β-TCP Struts and Electrospun PCL Coated with Collagen and HA for Bone Regeneration, Chem. Mater., vol. 24, Jul. 5, 2011, pp. 903-913.

Jakus et al., Biochemically Active Bioplotted Elastic Hydroxyapatite-Based Tissue Engineering Scaffolds: Structural, Mechanical, and in vitro Evaluation, Abstract for Presentation at TMS Pacific Rim International Congress on Advanced Materials and Processing Waikoloa, HA, Aug. 7, 2013.

Jakus et al., 3D-Printed Hyperelastic Bone for Hard-Tissue Engineering Applications, Abstract for Presentation at Hilliard Symposium, Northwestern University, May 15, 2014.

Intl. Search Report & Written Opinion issued for Intl. Patent Appl. No. PCT/US2015/030972, mailed on Aug. 26, 2015, 15 pages.

* cited by examiner

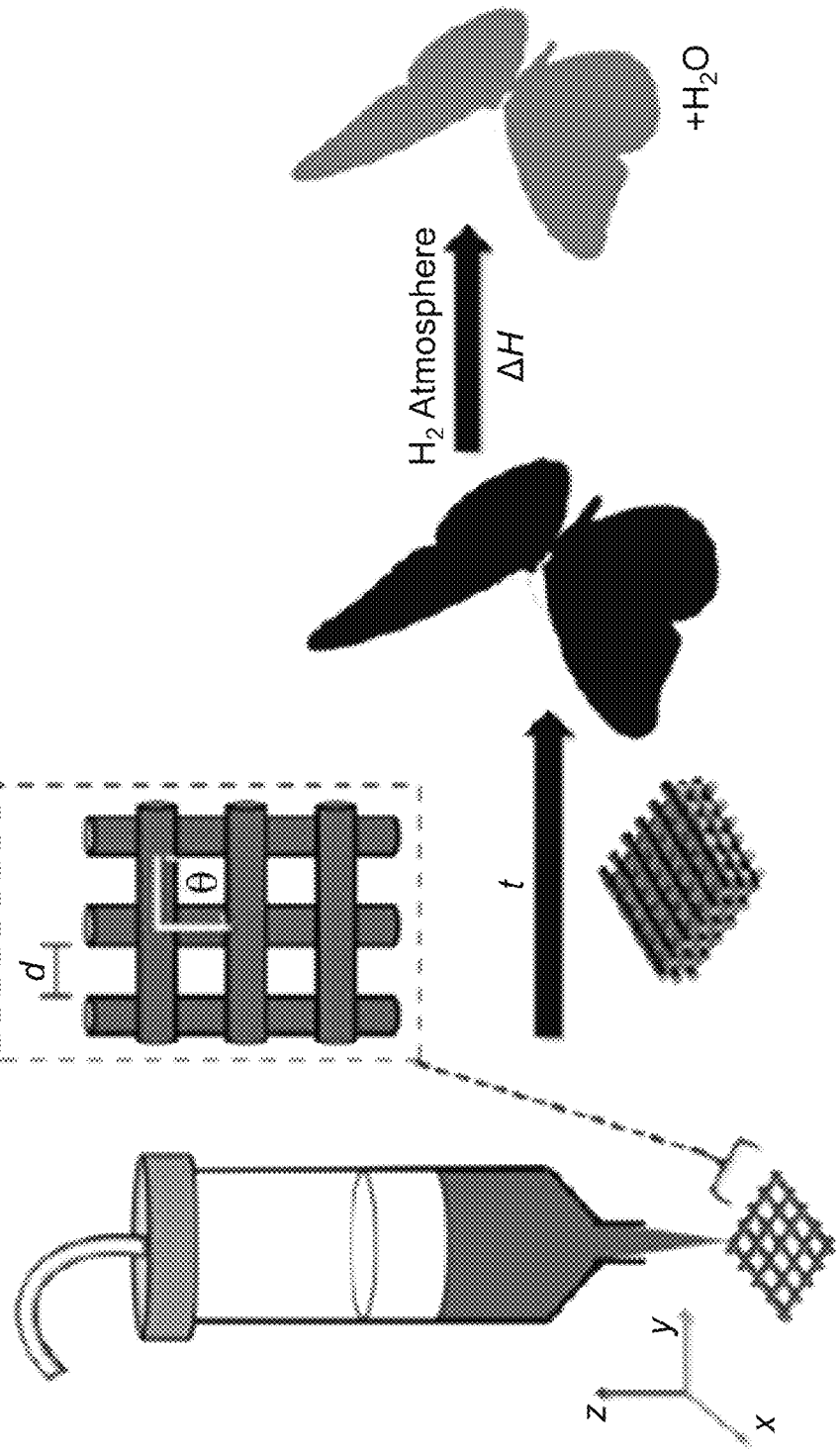

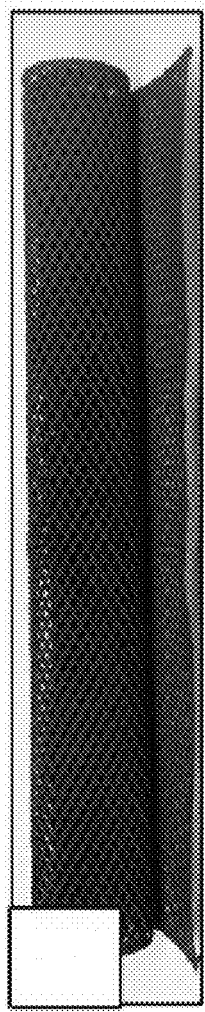
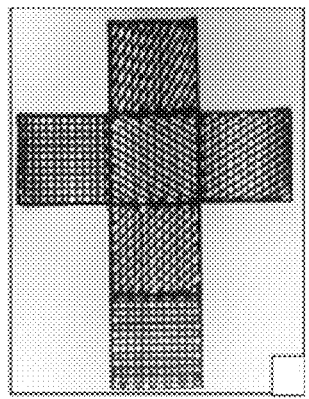
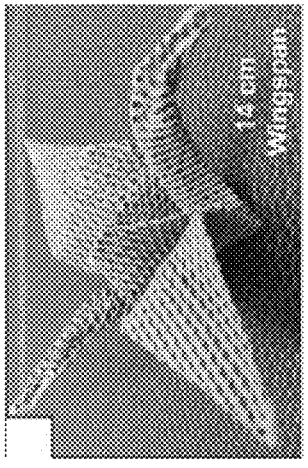
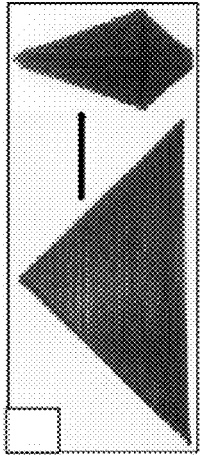
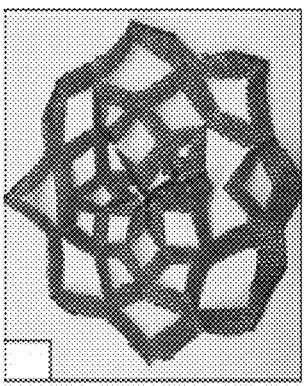

METHODS FOR FABRICATING THREE-DIMENSIONAL METALLIC OBJECTS VIA ADDITIVE MANUFACTURING USING METAL OXIDE PASTES

CROSS-REFERENCE TO RELATED APPLICATIONS

The present application claims priority to U.S. Provisional Patent Application No. 61/861,501 that was filed Aug. 2, 2013, the entire contents of which is hereby incorporated by reference.

BACKGROUND

Advanced manufacturing technologies, particularly those based on additive manufacturing, are becoming increasingly prevalent in research and industry due to their production versatility, scalability, and customizability. However, many current additive manufacturing technologies and methods lack the capability to efficiently produce three-dimensional objects composed of high melting materials, particularly metals, metal alloys, and metal/ceramic composites. Existing technologies are often restricted to a select few materials (i.e., relatively expensive metal powders having particles greater than 1 µm in size) and involve the use of expensive laser and electron beam systems. Furthermore, a high vacuum environment is also often necessary for these systems to prevent oxidation of metals during beam-assisted sintering. Consequently, there are still a wide variety of material systems that have not yet been used in additive manufacturing processes due to their lack of compatibility with current methods.

SUMMARY

In one aspect, a method of forming a three-dimensional metallic object is provided comprising extruding a metal oxide paste comprising metal oxide particles, a polymeric binder and an organic solvent, through a tip to deposit sequential layers of the metal oxide paste on a substrate, whereby a three-dimensional metal oxide object is formed on the substrate, and exposing the three-dimensional metal oxide object to a reducing gas at a temperature and for a period of time sufficient to reduce and to sinter the metal oxide particles, whereby the three-dimensional metallic object is formed.

In other aspects, the three-dimensional metallic objects, the metal oxide pastes and the methods of forming the metal oxide pastes are provided.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1 illustrates the formation of a three-dimensional metallic object according to an illustrative embodiment. A metal oxide paste is formed as described herein. As shown in (A), the paste is extruded via layer-by-layer additive manufacturing to produce a green body of the desired part (B). By controlling inter-strut spacing, d, large-scale, ordered porosity can be introduced into the object if desired, otherwise d=0 produces a solid structure. By controlling the extrusion orientation, θ, of each layer, pore geometry can be controlled. The green body is then transferred to a hydrogen atmosphere and heated to promote reduction of the metal oxide particles to metal plus water and also to sinter the resulting metal particles to form a fully stable, slightly smaller, metallic or metal/ceramic composite object (C).

FIG. 9 shows thin printed $Fe_2O_3$ sheets (composed of three printed layers) which have been subjected to a variety of deformation steps prior to reduction/sintering, including being rolled (A), folded (B and C, the structure C may be folded into a box), or cut and bent (D). The origami crane shown in (E) shows that three-dimensional objects having more complexity than the extruded object may be made using such deformation steps.

DETAILED DESCRIPTION

Figure 2A:
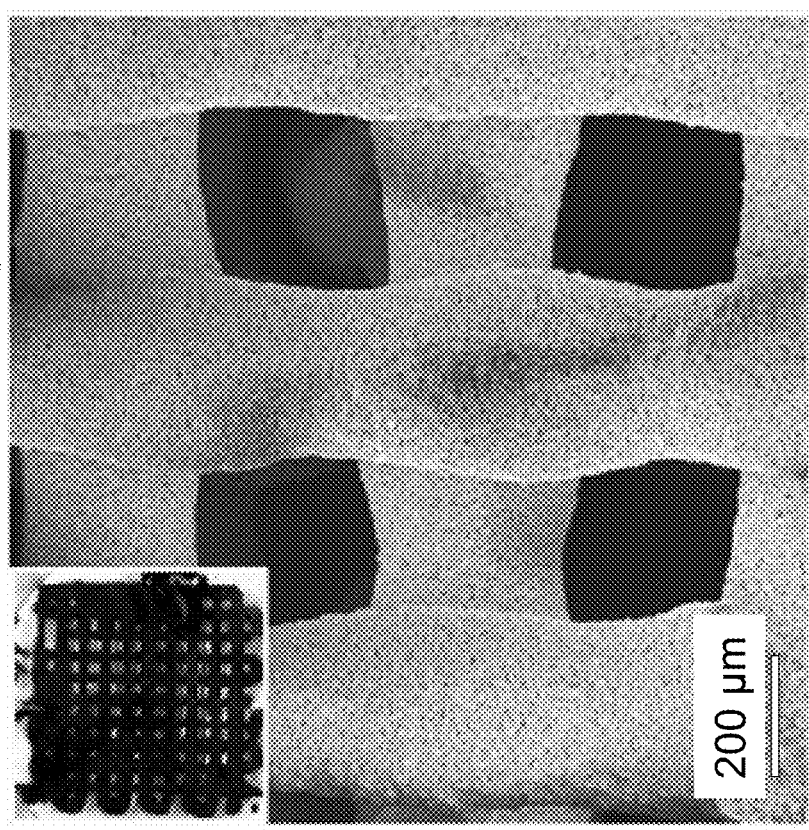
FIG. 2 shows scanning electron microscope images at several magnifications showing the structure and microstructure of the as-printed copper oxide green body before reduction and sintering (A and B) and copper body after reduction and sintering (C and D). Insets depict macroscopic images of the metal oxide (A and B) and metal (C and D). The inter-strut porosity is evident in the low magnification images (A and C) and the intra-strut porosity is evident in the higher magnification images (B and D).
Figure 2B:
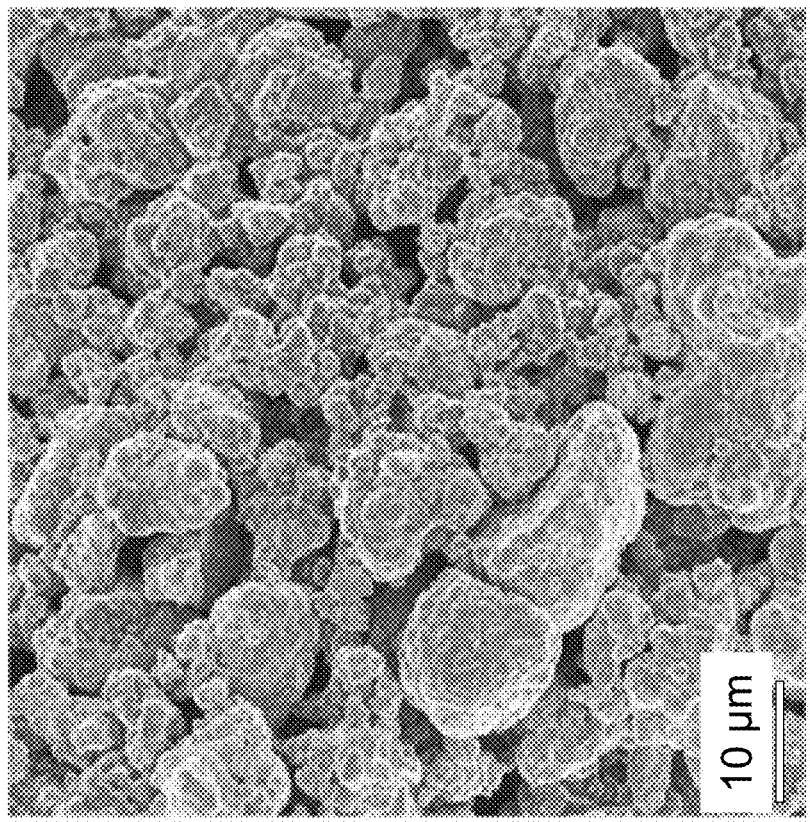
Figure 2C:
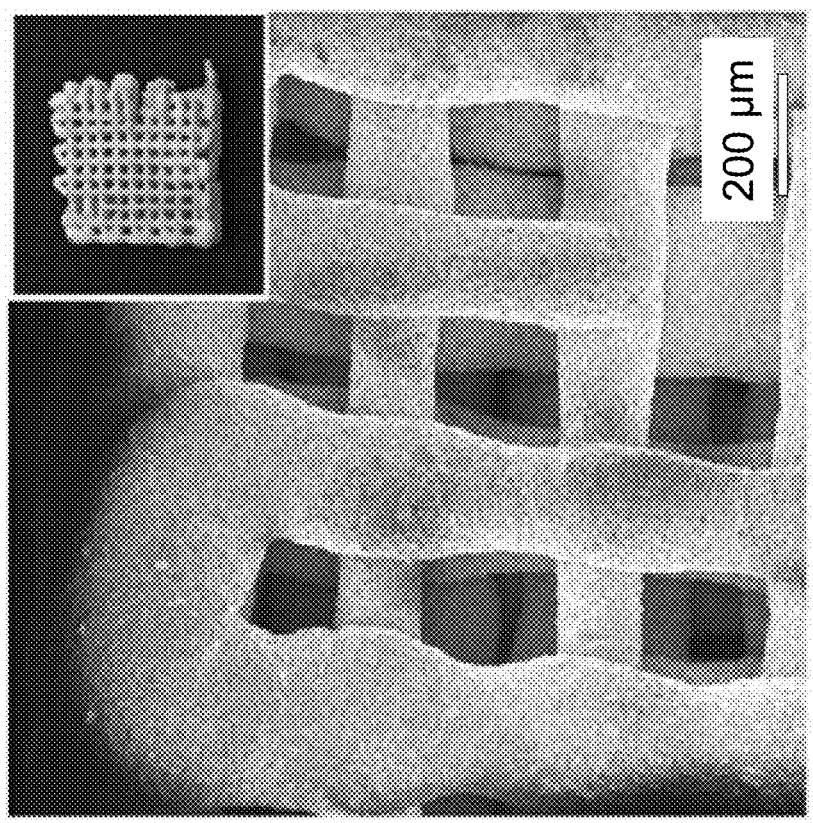
Figure 2D:
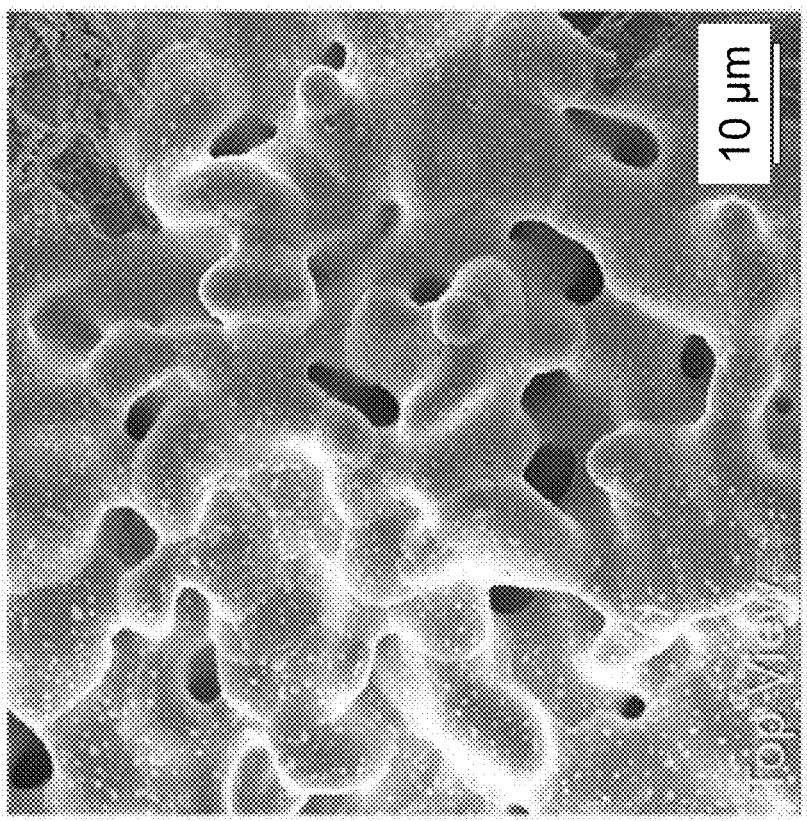

Provided herein are methods of forming three-dimensional metallic objects via additive manufacturing using metal oxide pastes.

The term "ink" may also be used to refer to the pastes disclosed herein.

The methods combine extrusion-based additive manufacturing with high temperature chemical reduction to produce three-dimensional metallic objects composed of a single type of metal, simple and complex metal alloys, or metal/ceramic composites with near micron precision. The methods use metal oxide pastes comprising metal oxide particles, a polymeric binder, and an organic solvent. The metal oxide pastes, which may comprise inexpensive metal oxide powders having particles sizes smaller than typical commercial metallic powders, are extruded layer-by-layer onto a substrate using, e.g., a three-dimensionally controlled robot head, to form a three-dimensional metal oxide object (also referred to as a "green body"). The extruded three-dimensional metal oxide objects are then subjected to elevated temperatures in the presence of a reducing gas to reduce the metal oxide particles to metal as well as to sinter the particles together to form solid, dense three-dimensional metallic objects. The small size of the metal oxide particles allows rapid reduction and sintering, leading to a much finer surface finish of the printed object. Various parameters such as particle size and the conditions of reduction and sintering may be controlled to achieve a desired porosity of the metallic matrix. By adjusting the porosity, it is possible to adjust the surface area of the metallic matrix.

The methods find use in a broad range of technologies, including energy technologies (e.g., high capacity, high power batteries, capacitors, fuel cells, solar cell current collectors); biomedical technologies (e.g., custom implants fabricated from advanced biomedical alloys); micromachine parts; actuator and sensor technologies; advanced heat exchangers; fabrication of custom, low volume objects/parts composed of specialty metal alloys; custom-made jewelry, eyeglasses and watches; ballistic/explosive barrier components; catalyst substrates; and reactive metal (thermite) objects for controlled oxygen free (under water or space) welding.

The methods use metal oxide pastes comprising metal oxide particles, a polymeric binder, and an organic solvent. A variety of metal oxides may be used for the metal oxide particles. The metal oxide is desirably a metal oxide that is capable of being reduced. By way of example only, oxides of iron (Fe) (e.g., $Fe_2O_3$), copper (Cu) (e.g., CuO), nickel (Ni) (e.g., NiO), cobalt (Co), manganese (Mn), and zinc (Zn) (e.g., ZnO) may be used. The metal oxide pastes may contain a single type of metal oxide (e.g., CuO) so that after extrusion, reduction and sintering, the three-dimensional metallic object will be composed of the corresponding pure metal (i.e., Cu). The metal oxide pastes may contain different types of metal oxides (e.g., CuO and ZnO) in different ratios so that after extrusion, reduction and sintering, the three-dimensional metallic object will be composed of the corresponding metal alloy (i.e., brass). A combination of NiO and $Fe_2O_3$ is another example to form an alloy of Ni and Fe. Metal oxide pastes may contain the appropriate metal oxides to provide three-dimensional metallic objects composed of binary alloys (e.g., CuNi) as well as more complex alloys (e.g., Kovar alloy which includes Fe, Co, Mn and Ni).

The size (i.e., diameter) of the metal oxide particles is that which is sufficient to achieve a desired porosity and/or desired surface roughness of the three-dimensional metallic object. However, the metal oxide particles are desirably microscale or nanoscale. In some embodiments, the metal oxide particles are characterized by an average diameter in the range of from about 2 nm to about 1 mm. This includes embodiments in which the average diameter is in the range of from about 2 nm to about 500 µm, from about 2 nm to about 50 µm, or from about 2 nm to about 1 µm. This further includes embodiments in which the average diameter is in the range of from about 10 nm to about 20 µm, from about 10 nm to about 10 µm, or from about 10 nm to about 1 µm. This further includes embodiments in which the average diameter is in the range of from about 1 µm to about 50 µm or from about 10 nm to about 50 nm. In some embodiments, the average diameter is less than about 1 µm. This includes embodiments in which the average diameter is less than about 500 nm, less than about 250 nm, or less than about 100 nm. The "diameter" of a non-spherical particle may be taken as the largest dimension across the particle. By "average diameter" it is meant the average value of the diameters of individual particles in a collection of particles.

A variety of polymeric binders may be used in the metal oxide pastes, provided the polymeric binder is capable of forming a coating over the surface of the metal oxide particles. The polymeric binder is desirably soluble in dichloromethane. In some embodiments, the polymeric binder is polycaprolactone (PCL). Other exemplary, suitable polymeric binders include poly lactic acid, poly glycolic acid, low density polyethylene, poly acrylic acid, poly methyl methacrylate and polylactic-co-glycolic acid (PLGA). Poly glycolic acid may also be referred to as poly glycolide and polylactic-co-glycolic acid may also be referred to as polylactide-co-glycolide. Combinations of different polymeric binders may be used. In some embodiments, the polymeric binder is not an acrylate-based tri-block copolymer.

A variety of organic solvents may be used in the metal oxide pastes, provided the organic solvents are capable of supporting a suspension of the metal oxide particles and/or dissolving the polymeric binder. By way of example only, suitable organic solvents include dichloromethane and 2-butoxyethanol. Combinations of different organic solvents may be used. The metal oxide pastes may comprise additives. A suitable additive is dibutyl phthalate. Dibutyl phthalate may also be used as the organic solvent.

The metal oxide pastes may further comprise ceramic particles in additional to the metal oxide particles. Metal oxide pastes comprising additional ceramic particles can be used to form three-dimensional metallic objects composed of a ceramic-particle-reinforced metal (or metal alloy) matrix. A variety of ceramics may be used for the ceramic particles, including oxides, nitrides, phosphides, chlorides, fluorides, iodides, amides, hydrides. Metal oxide ceramic particles may also be used. The ceramic particles may be composed of a non-reducing ceramic, including a non-reducing oxide ceramic (e.g., $Al_2O_3$). A "non-reducing oxide" may refer to an oxide that is not substantially reduced under the conditions selected for reducing the metal oxide(s) in the metal oxide paste. As another example, the ceramic particles may be composed of $Y_2O_3$. The size of the ceramic particles may be as described above with respect to the size of the metal oxide particles, although other sizes are possible.

The metal oxide pastes are made by forming a homogenous suspension of metal oxide particles coated by a polymeric binder in an organic solvent. The suspension may be formed by mixing the metal oxide particles in the organic solvent and sonicating and/or stirring the mixture under conditions and for a period of time sufficient to disperse the metal oxide particles in the organic solvent; and adding the polymer binder to the mixture and sonicating and/or stirring the mixture under conditions and for a period of time sufficient to coat the metal oxide particles with the polymeric binder. Suitable, exemplary conditions and periods of time are described in the Examples below. Ceramic particles and additives may be included in the homogeneous suspension. Subsequent steps include separating the homogenous suspension into the metal oxide paste and a supernatant (e.g., via centrifugation) and removing the supernatant. The formation of the metal oxide pastes may take place at room temperature. The separation of the homogeneous suspension into the metal oxide paste and a supernatant and removal of the supernatant may also occur via evaporation. For example, the homogenous suspension may be thickened (i.e., via solvent removal) by sonicating and/or stirring the suspension at an elevated temperature for a period of time. The temperature and time may be selected to achieve a desired viscosity for the metal oxide paste. A suitable temperature is in the range of from about 30° C. to about 50° C. Exemplary temperatures and times are described in the Examples below.

The desired volume % of the metal oxide/ceramic particles in the homogenous suspension may depend upon the size of the particles. By volume % it is meant the (volume of the metal oxide/ceramic particles)/(volume of the metal oxide/ceramic particles plus the volume of the polymeric binder) *100, that is, the volume of the metal oxide/ceramic particles as compared to the total volume of solids in the suspension. In some embodiments in which the metal oxide/ceramic particles are characterized by a size of about 1 µm or greater, the volume % of the metal oxide/ceramic particles is about 80% or greater. In some embodiments in which the metal oxide/ceramic particles are characterized by a size of 0.1 µm or less, the volume % of the metal oxide/ceramic particles is in the range of about 55% to about 60%.

The desired volume % of the polymeric binding in the homogeneous solution generally depends upon the volume % of the metal oxide/ceramic particles and is desirably sufficient to form a coating over the surface of the particles. By volume % it is meant the (volume of the polymeric binder)/(volume of the metal oxide/ceramic particles plus the volume of the polymeric binder)*100, that is, the volume of the polymeric binder as compared to the total volume of solids in the suspension. In some embodiments, the volume % of the polymeric binder is about 30% or less. This includes embodiments in which the volume % of the polymeric binder is in the range of from about 10% to about 30%.

In some embodiments, a metal oxide paste is made from a homogeneous suspension (or a metal oxide paste) comprising microscale or nanoscale $Fe_2O_3$ particles, $Y_2O_3$ particles having an average diameter of less than about 20 nm, a polymeric binder and an organic solvent. The volume % of the $Fe_2O_3$ particles may be about 69%, the volume % of the $Y_2O_3$ particles may be from about 1% to about 2%, with the remainder of the desired volume % coming from the polymeric binder. Such a homogeneous suspension (or metal oxide paste) can be used to form a three-dimensional ceramic-particle-reinforced metallic matrix.

The volume percentages referenced above refer to the homogeneous suspension. However, since only organic solvent is removed during the formation of the metal oxide paste, the volume percentages referenced above may also be used to refer to the metal oxide paste.

The metal oxide pastes are desirably not colloidal in nature. Colloidal inks must be stabilized based on pH, which is highly variable depending upon the type of metal, metal oxide, or ceramic particle being printed. As such, colloidal inks must be independently optimized for the desired type of metal, metal oxide, or ceramic particle prior to printing. By contrast, the disclosed methods of making the metal oxide pastes are not specific to the type of metal, metal oxide or ceramic particle and do not require independent optimization. As such, the disclosed methods are "universal." In addition, the metal oxide pastes are characterized by high concentrations of metal oxide particles and relatively little organic solvent. As such, they are relatively thick liquids. During printing of the metal oxide pastes to form extruded fibers and extruded green bodies from the extruded fibers, a sufficient amount of organic solvent rapidly evaporates from the extruded fibers to provide self-supporting extruded fibers/extruded green bodies, i.e., extruded fibers/extruded green bodies which are capable of substantially retaining their extruded shapes. This means that the disclosed methods can be used to form extruded green bodies which are several layers tall (e.g., at least six, at least twenty, etc.), have intricate, complex shapes (see FIGS. 1 and 5) and which can be easily manipulated via a number of deformation operations (see below). However, a sufficient amount of organic solvent remains in the extruded fibers such that an extruded fiber can merge with a neighboring extruded fiber, i.e., a subsequently deposited extruded fiber. In some embodiments, the volume % of the metal oxide/ceramic particles in the metal oxide paste is at least about 50%. This includes embodiments in which the volume % is at least about 60%, at least about 70%, at least about 80%, or at least about 90%. By volume % it is meant the (volume of the metal oxide/ceramic particles)/(total volume of the metal oxide paste)* 100.

The methods of forming a three-dimensional metallic object comprise extruding any one of the metal oxide pastes described herein through a tip to deposit sequential layers of the metal oxide paste on a substrate, whereby a three-dimensional metal oxide object is formed on the substrate, and exposing the three-dimensional metal oxide object to a reducing gas at a temperature and for a period of time sufficient to reduce and to sinter the metal oxide particles, whereby the three-dimensional metallic object is formed. The extrusion step may take place at room temperature. The extruded three-dimensional metal oxide object may be referred to as a "green body." The composition of the reducing gas may be varied, depending upon the composition of the metal oxide paste. By way of example only, the reducing gas may be pure hydrogen gas. As another example, the reducing gas may be a mixture of gases comprising hydrogen gas and an inert gas (e.g., Ar), which is suitable for reducing CuO to Cu and $Fe_2O_3$ to Fe. Different percentages of the gases (e.g., $H_2$) in the gas mixture may be used (e.g., about 4% $H_2$); different $H_2/H_2O$ partial pressures may be used (water vapor may be a by-product of the reduction process); and different temperatures and periods of time may be used, each depending upon the composition of the metal oxide paste. By way of example only, for metal oxide pastes comprising metal oxide particles and ceramic particles, $H_2/H_2O$ partial pressures and temperatures may be adjusted such that the metal oxide particles are reduced and sintered while the ceramic particles remain chemically and structurally stable in their oxidized state. The reducing gas and temperature may also be adjusted to provide a desired porosity for the three-dimensional metallic object, including a desired intra-strut porosity as described below. Suitable, exemplary reducing gases, temperatures and periods of time are described in the Examples below.

Prior to reducing and sintering the extruded three-dimensional metal oxide object, the object may be subjected to various other steps. For example, the extruded three-dimensional metal oxide object may be subjected to a temperature sufficient to remove at least some of the organic solvent and/or polymeric binder from the object (i.e., a debinding step). Similarly, the extruded three-dimensional metal oxide object may be structurally modified, e.g., by subsequent folding, rolling, bending, cutting, fusing and other deformation operations. This enables the formation of objects which are more complex than could be obtained by printing alone.

An extrusion-based rapid prototyping instrument, such as a 3D-Bioplotter® (EnvisionTec, GmbH), may be used in the methods. A conical, polyethylene tip (the diameter of which may be in the range from about 200 µm to about 2 mm) using pressure inversely proportional to tip diameter may be used with the instrument. Extrusion may be done at room temperature onto an elevated temperature (e.g., 50° C.) substrate (e.g., Teflon) to permit rapid solvent evaporation and stabilization of the extruded, three-dimensional metal oxide object. The object to be printed may be first defined within a computer aided design (CAD) environment and exported as a standard lithographic (.STL) file. In the case of the 3D-Bioplotter, an inner structure pattern can be defined in addition to contour defined by the .STL file, permitting controlled, interconnected porosity, which may be useful for some applications. The extruded layers of metal oxide paste may comprise a plurality of "struts," the plurality of struts arranged according to the inner structure pattern and outer contour described above. The printer extrudes struts line-by-line, the thickness, spacing, and orientation of which, with respect to a previously printed layer, can be controlled by the diameter of the extrusion tip, user defined d, and user defined $\theta$ respectively (see FIG. 1). The line pattern may also be varied to produce spiral and radial patterns. Once one layer is completed, additional struts are deposited on top of the previous layer. This process continues, layer-by-layer to form a complete three-dimensional object.

To produce open, scaffold-like structures having "structural porosity" (which may also be referred to as "inter-strut porosity") d can be given a large value. In an extreme, d may be set to zero to produce a solid object with its porosity only resulting from the "sintering porosity" (which may also be referred to as "intra-strut porosity") within the struts themselves. As described above, sintering or intra-strut porosity is located within the struts and is dependent on particle size and packing within the struts, the type of metal, and the reducing and sintering conditions, including temperature and atmospheric $H_2$ content.

The 3D-Bioplotter is capable of extruding materials (e.g., metal oxide paste) from multiple cartridges, permitting each layer within a single three-dimensional metallic object to be composed of multiple materials (e.g., multiple metals). In addition, different layers within a single three-dimensional metallic object can be composed of different materials. By way of example only, a three-dimensional metallic object can comprise alternating layers of different metals. As another example, a three-dimensional metallic object can be compositionally graded such that base layer(s) are composed of a first metal (e.g., Cu), subsequent layers additionally include increasing amounts of a second metal (e.g., Ni) and top layer (s) are composed of the second metal. The 3D-Bioplotter is also capable of permitting the production of physically unsupported architectures via sequential deposition of a water soluble mold material.

The printing rate and time may vary, depending upon the type of green body being printed. By way of example, a 4 cm-diameter by 2 cm-tall $Fe_2O_3$ cylinder may be printed at 30 mm/s, taking about 1 hour to create.

The overall size of the three-dimensional metallic objects formed using the disclosed methods can be small (e.g., sub-mm) The upper size of the objects is not particularly limited (e.g., multi-meter).

It is to be understood that the present disclosure is not limited to metal oxide pastes. The present disclosure also encompasses and applies to pastes comprising non-oxide metal ceramic particles, i.e., to pastes comprising non-oxide metal ceramic particles, a polymeric binder and an organic solvent. Non-oxide metal ceramic particles may also be referred to as reducible metal salts. Suitable examples of non-oxide metal ceramic particles include metal nitrates, metal phosphates, metal carbonates, metal sulfates, metal halides (e.g., metal chlorides, metal fluorides, etc.), metal carbides and metal nitrides. Additional suitable examples of non-oxide metal ceramic particles include gold chloride ($Au_2Cl_6$), silver nitrate ($AgNO_3$), magnesium chloride (MgCl), iron phosphate ($Fe_3(PO_4)_2$), copper sulfate ($Cu_2SO_4$) and tungsten carbide (WC). Regarding the disclosed classes of metal oxide particles and non-oxide metal ceramic particles, both classes include metal-based particles. Thus, the present disclosure also encompasses and applies to pastes comprising metal-based particles more generally, i.e., to pastes comprising metal-based particles, a polymeric binder and an organic solvent.

The present disclosure also encompasses and applies to pastes comprising ceramics more generally, i.e., to pastes comprising ceramic particles, a polymeric binder and an organic solvent. Such pastes may be used to form three-dimensional ceramic objects. In some embodiments, the method of forming a three-dimensional ceramic object comprises extruding a ceramic paste comprising ceramic particles, a polymeric binder and an organic solvent, through a tip to deposit sequential layers of the ceramic paste on a substrate, whereby a three-dimensional ceramic paste object is formed on the substrate, and exposing the three-dimensional ceramic paste object to a vacuum at a temperature and for a period of time sufficient to sinter the ceramic particles, whereby the three-dimensional ceramic object is formed. Exemplary, suitable ceramic particles include hydroxyapatite particles, aluminum oxide particles, and titanium oxide particles.

EXAMPLES

Example 1

Metal oxide/ceramic particles were suspended within a solution of dichloromethane, 2-butoxyethanol, and dibutyl phthalate and dispersed via sonication for approximately 1 hour followed by magnetic stirring at 800 rpm. Polycaprolactone (PCL) binder, in the form of pellets, was gradually added to the mixing suspension and permitted to fully dissolve. The total amount of metal oxide/ceramic particles comprised ≤80 vol % of the solid mass (metal oxide/ceramics plus PCL) for suspensions comprised of ≤1 micron particles and 55-60 vol % for suspensions comprised of ≤0.1 micron particles. The solvent-particle-PCL suspension was continuously stirred at 800 rpm for at least 24 hours to ensure complete coating of oxide particles with PCL. After 24 hours, the homogenous suspension was briefly sonicated to disrupt particle aggregates and magnetically stirred an additional 5 minutes at 800 rpm prior to being transferred to the extrusion cartridge. The suspension was then sedimented out via centrifugation at 1500 rpm for 5 minutes. The clear, solvent supernatant was removed leaving behind the compact oxide-binder paste. As shown in FIG. 1, the paste was extruded (A) using an extrusion-based rapid prototyping instrument, 3D-Bioplotter® (EnvisionTec, GmbH) using a conical, polyethylene tip using pressure inversely proportional to tip diameter to form the desired "green body" (B).

The green bodies were then transferred to a furnace chamber. After several atmosphere purges using inert gas, vacuum was pulled on the chamber followed by subsequent filling with a gas mixture (e.g., 5% $H_2$/95% Ar). The flow rate of the gas mixture was about 160 mL/min. The furnace was then elevated to temperatures sufficient for the reduction and sintering of the particular metal for a set amount of time (e.g., Cu at about 1000° C. for about 1 h) to produce a three-dimensional metallic object (FIG. 1C).

FIG. 2 shows scanning electron microscopy images of an extruded, three-dimensional CuO object (a CuO green body) (A and B) and the corresponding three-dimensional Cu object obtained after reduction and sintering (C and D). Other images (not shown) reveal that the surface reflectance and color of the copper oxide green body after reduction and sintering was indicative of copper.

Figure 3A:
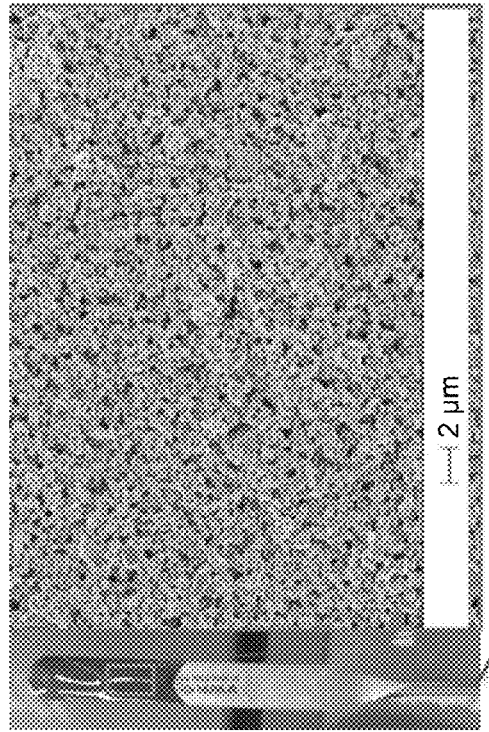
FIG. 3 shows a metal oxide paste comprising $Fe_2O_3$ particles ready for three-dimensional printing and a scanning electron microscope image of the paste (A). Also shown is the metal oxide paste as it is extruded to deposit a layer of the metal oxide paste on a substrate (B) and the sequentially deposited layers forming various three-dimensional $Fe_2O_3$ objects (C).
Figure 3C:
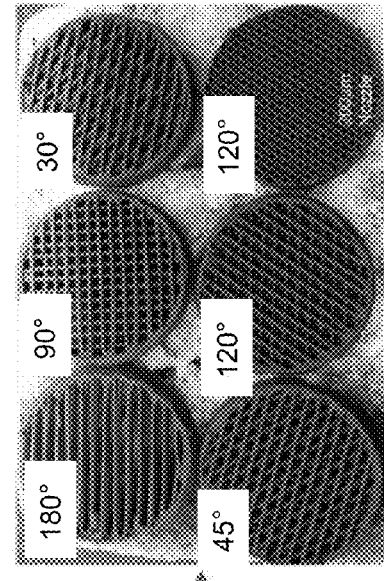
Figure 3B:
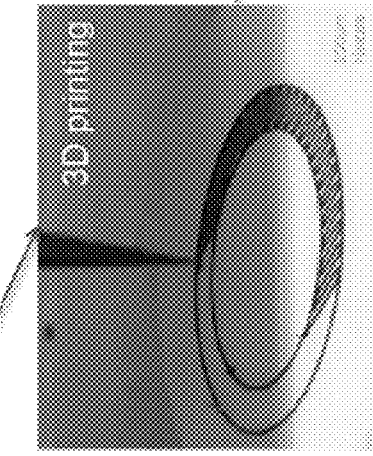
Figure 4:
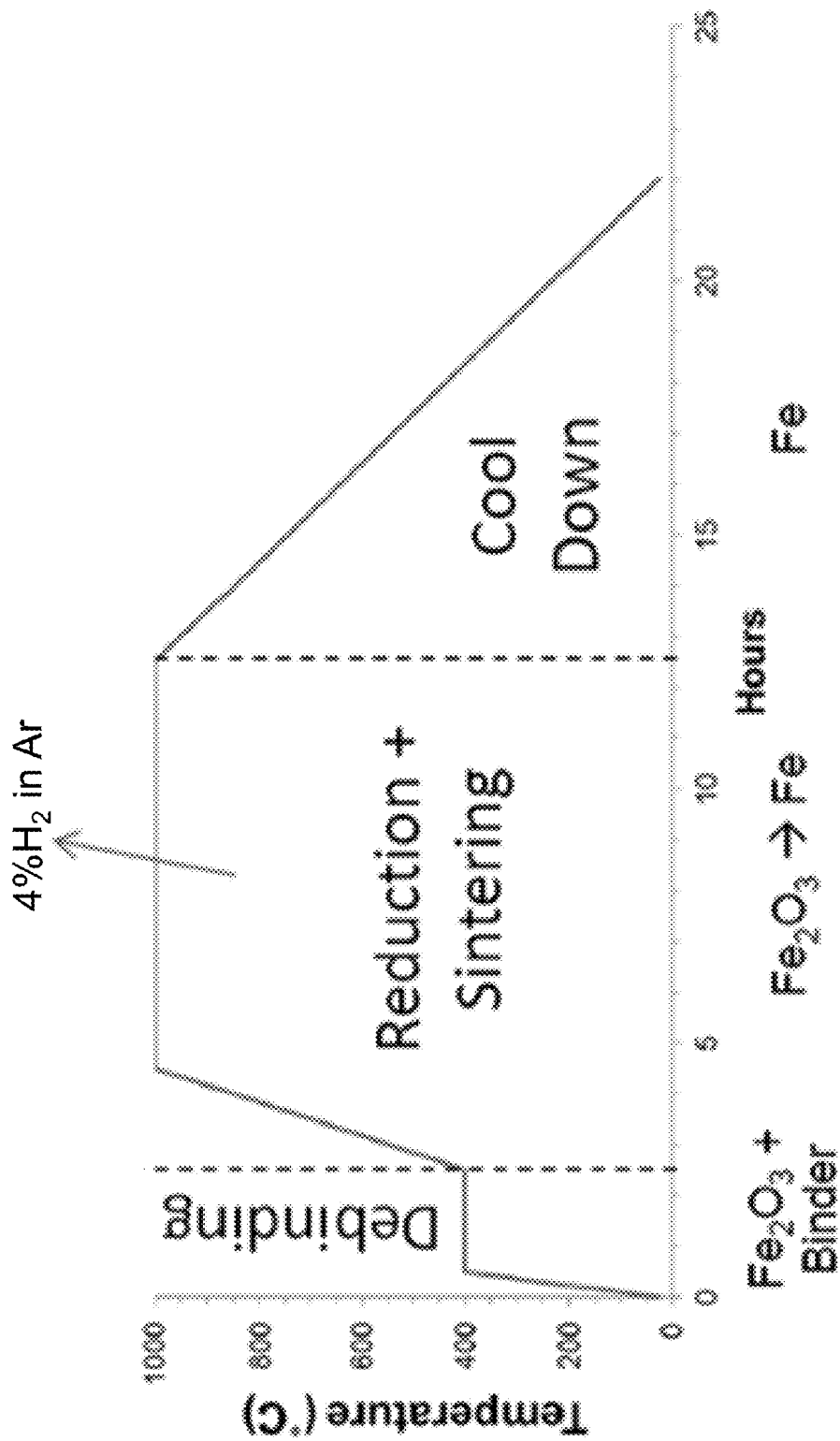
FIG. 4 shows the temperature and time profiles as three-dimensional $Fe_2O_3$ objects from FIG. 3C were exposed to a gas mixture of 4% $H_2$ in Ar at a temperature and for a period of time sufficient to reduce and to sinter the $Fe_2O_3$ particles to form the corresponding three-dimensional Fe objects.

FIG. 3 shows a metal oxide paste comprising $Fe_2O_3$ particles ready for three-dimensional printing and a scanning electron microscope image of the paste (A). Also shown is the metal oxide paste as it is extruded to deposit a layer of the metal oxide paste on a substrate (B) and the sequentially deposited layers forming various three-dimensional $Fe_2O_3$ objects (C) having varying internal structure as the angle θ as defined in FIG. 1 varies. As shown in FIG. 4, the three-dimensional $Fe_2O_3$ objects from FIG. 3C were exposed to a gas mixture of 4% $H_2$ in Ar at a temperature and for a period of time sufficient to reduce and to sinter the $Fe_2O_3$ particles to form three-dimensional Fe objects. The three-dimensional Fe objects were shown to be magnetic (unlike $Fe_2O_3$). There was about a 50% volume reduction of the green body upon reduction/sintering.

Figure 5A:
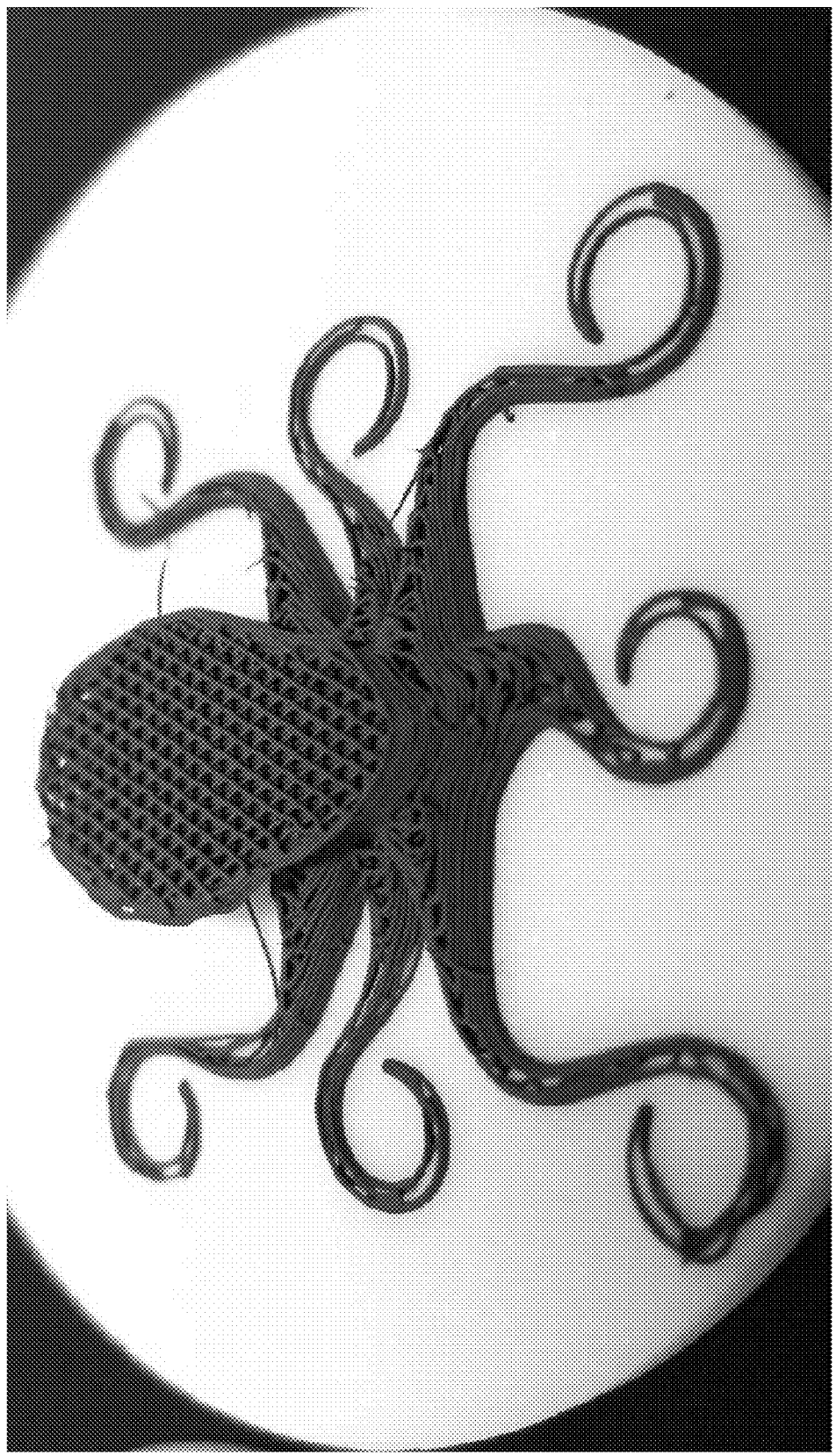
FIG. 5 shows an extruded three-dimensional metal oxide object having a complex three-dimensional shape (A) and the corresponding three-dimensional metallic object obtained after reduction and sintering (B). The magnified image (C) shows the metal strands (struts) of the metallic matrix.
Figure 5B:
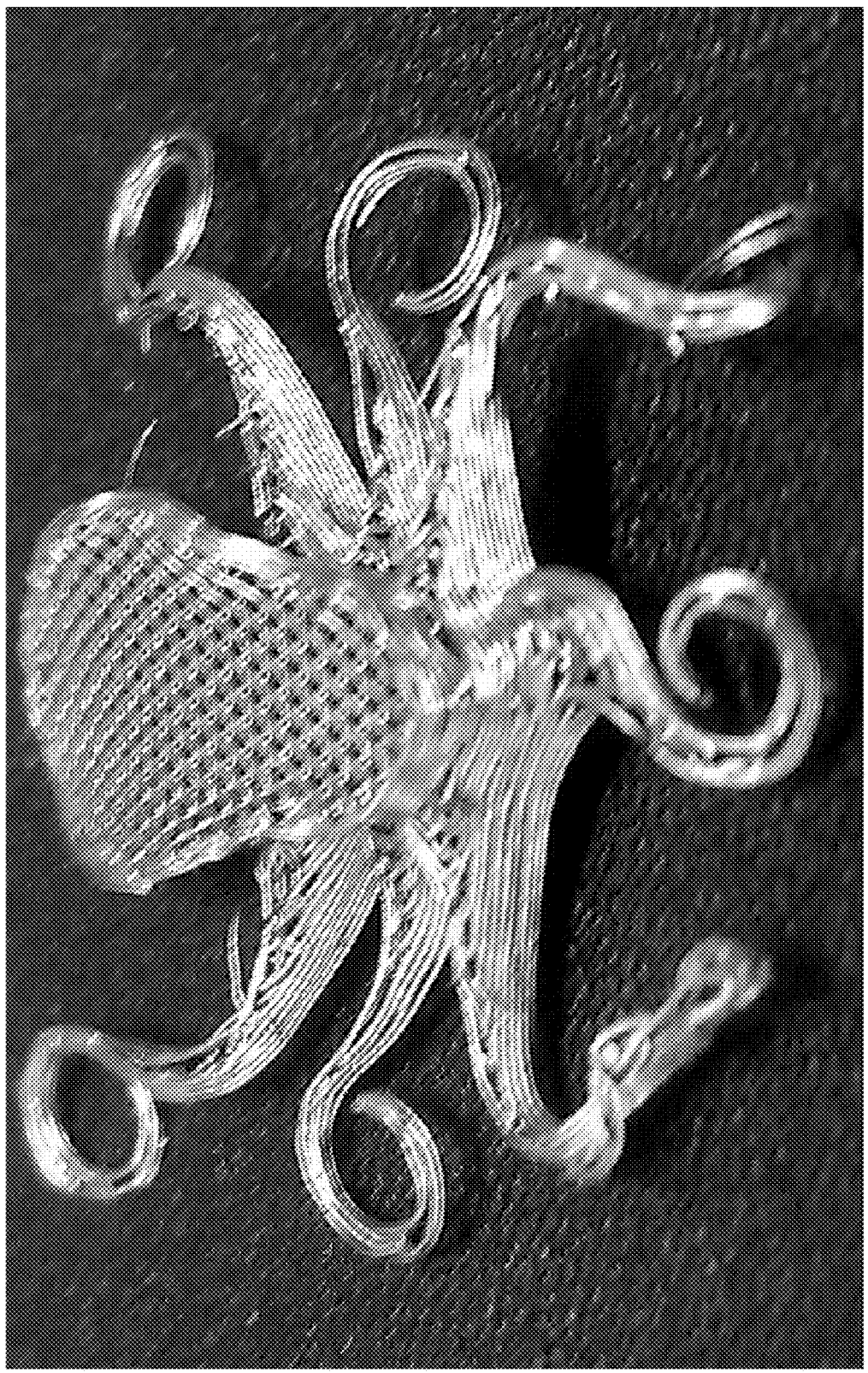
Figure 5C:
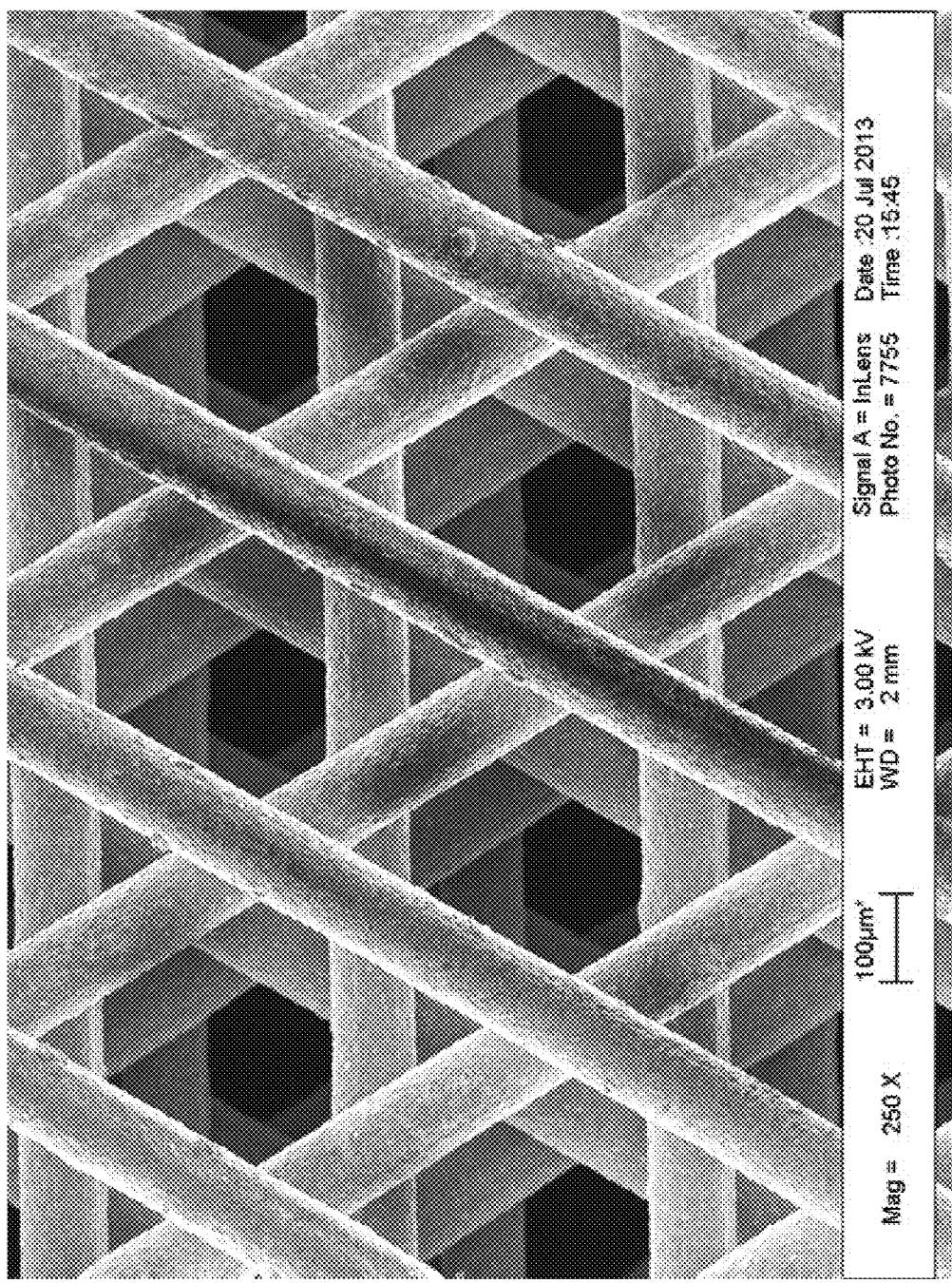

FIG. 5 shows an extruded three-dimensional metal oxide object having a complex three-dimensional shape (A) and the corresponding three-dimensional metallic object obtained after reduction and sintering (B), showing that the complex, curved three-dimensional shape has been retained. The green body was printed quickly, in five minutes. A magnified image of the metal strands (struts) is shown in FIG. 5C. The image shows that the disclosed methods are capable of providing three-dimensional metallic structures composed of a matrix of very narrow (e.g., about 100 μm), well-defined, uniform metal strands with high structural integrity even after reducing and sintering. Other scanning electron microscope images (not shown) of the individual struts of the three-dimensional metallic object reveal that the material has close to 100% density (i.e., intra-strut porosity of about 0%), which is difficult to achieve with conventional sintering or laser based methods.

Example 2

Metal oxide/ceramic particles were suspended within a solution of dichloromethane, 2-butoxyethanol, and dibutyl phthalate. Particle sizes in the range of from about 1 μm to about 5 μm were used. A separate solution comprised of a polymeric binder, either polycaprolactone or polylactic-co-glycolic acid, in dichloromethane was made by dissolving the polymeric binder in the dichloromethane. Once the polymeric binder had fully dissolved, the metal oxide/ceramic particle suspension was added to the polymeric binder solution and thoroughly mixed to form a homogeneous suspension. The volume % of the metal oxide/ceramic particles (i.e., (volume of the metal oxide/ceramic particles)/(volume of the metal oxide/ceramic particles plus the volume of the polymeric binder)) in the homogeneous suspensions was in the range of from about 70% to about 90%. The corresponding volume % of the polymeric binder (i.e., (volume of the polymeric binder)/(volume of the metal oxide/ceramic particles plus the volume of the polymeric binder)) was in the range of from about 30% to about 10%. To form the paste, the homogeneous suspension was left open to atmosphere at an elevated temperature (about 45° C.) while being sonicated and occasionally physically stirred until the suspension was reduced in volume had thickened to a viscosity of about 25 Pa·s. Using this method, large volumes of pastes may be formed, e.g., about 1 L, which can provide up to about 500 $cm^3$ of printed material.

The resulting pastes were extruded as described in Example 1, above, to form the desired green body. Green bodies were highly stable and retained their forms after being submerged in water for about six months. The green bodies were subsequently reduced and sintered generally as described in Example 1, above, except that in some cases, a reducing gas of pure $H_2$ was used at a flow rate of about 160 mL/min.

Figure 6:
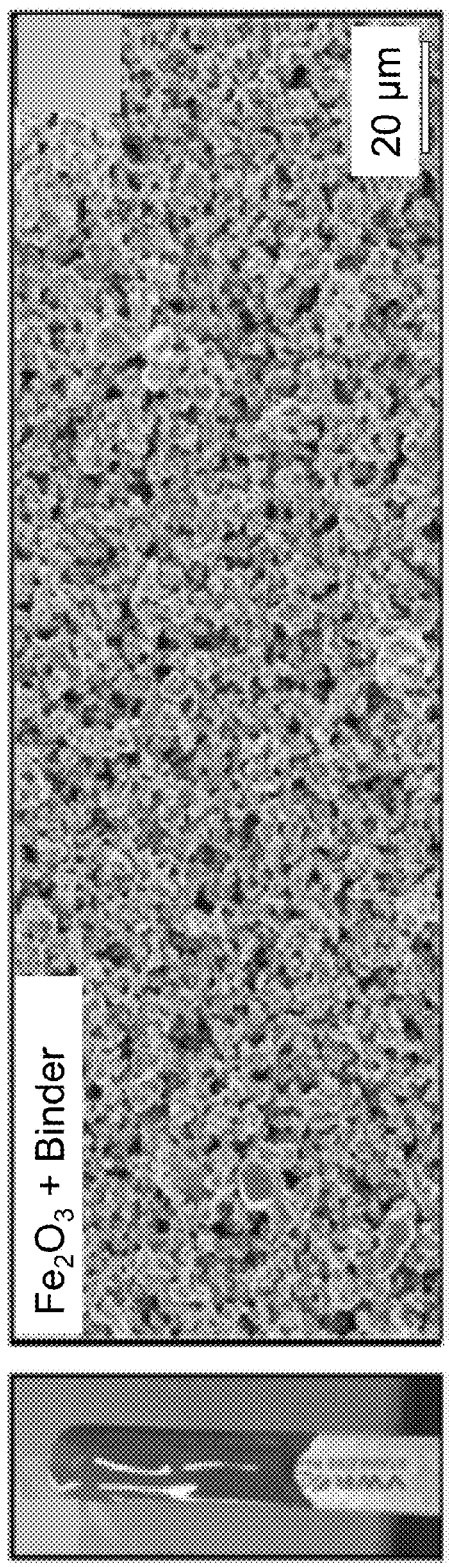
FIG. 6 shows the consistency of a $Fe_2O_3$ paste made according to another illustrative embodiment prior to printing (left) and a scanning electron microscope image of the paste (right).

FIG. 6 shows the consistency of a $Fe_2O_3$ paste prior to printing (left) and a scanning electron microscope image of the paste (right).

Figure 7:
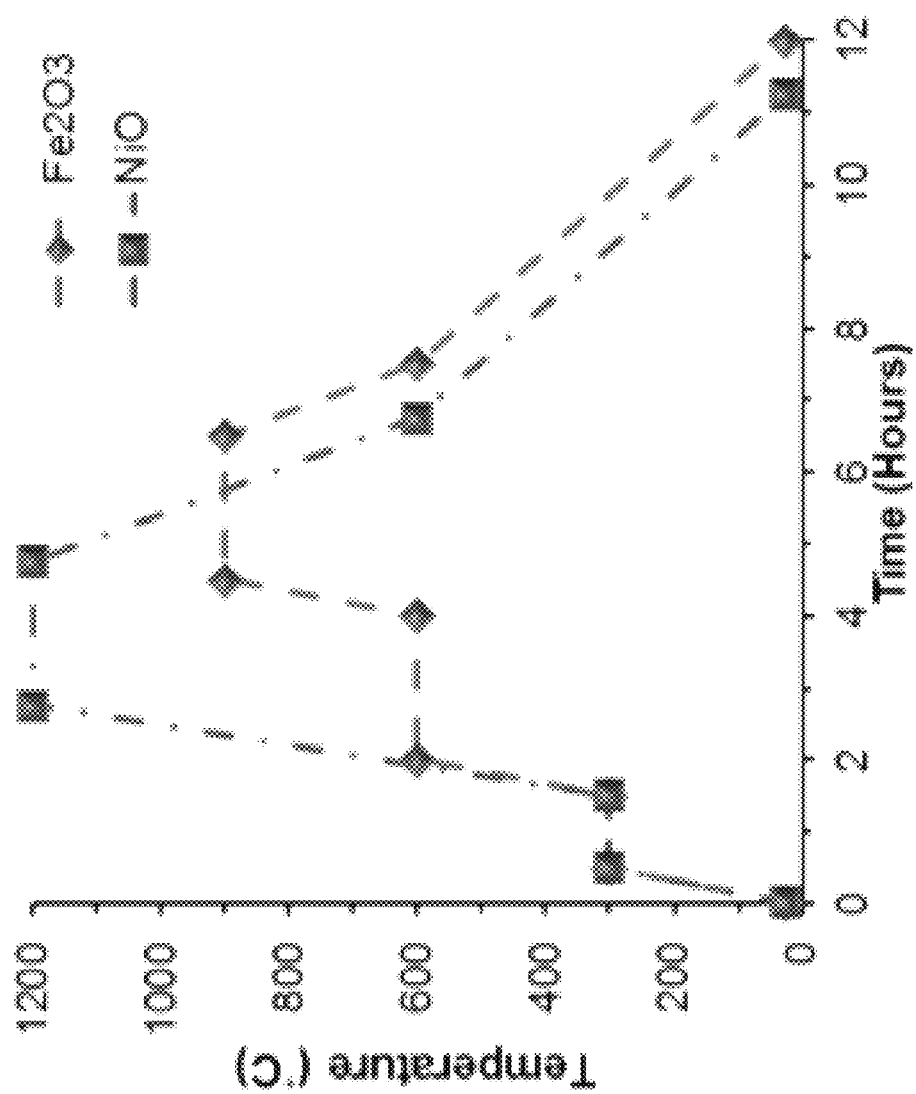
FIG. 7 shows the time and temperature profiles for debinding, reducing and sintering $Fe_2O_3$ and NiO green bodies in pure $H_2$ gas.

FIG. 7 shows the time and temperature profiles for debinding, reducing and sintering printed $Fe_2O_3$ and NiO green bodies in pure $H_2$ gas. The $Fe_2O_3$ green body was reduced/sintered in two stages at a first temperature of about 600° C. for a first time of about two hours and at a second temperature of about 900° C. for a second time of about two hours.

Figure 8:
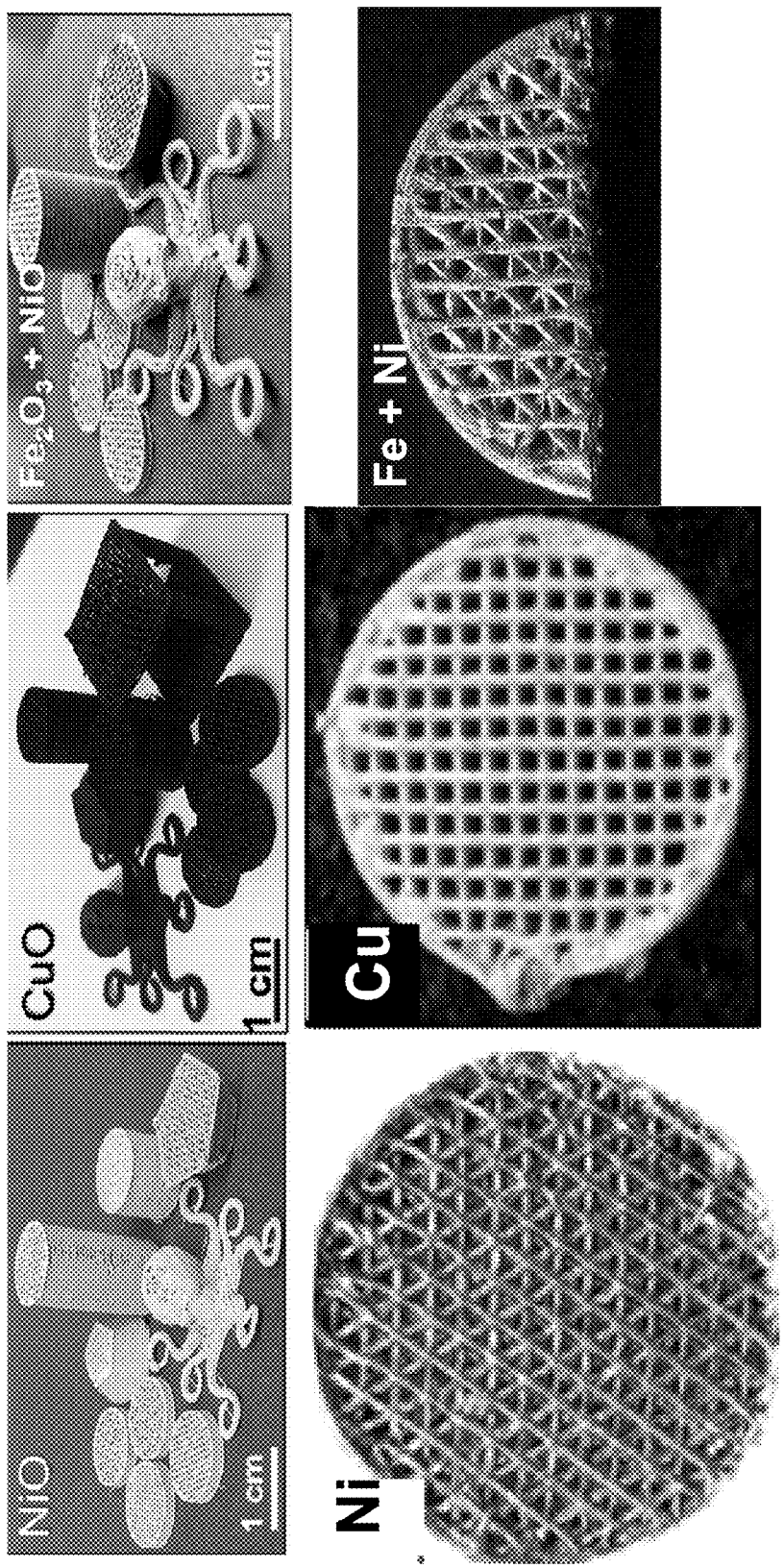
FIG. 8 shows three sets of three-dimensional metal oxide objects (top) and for each type of metal oxide object, one of the corresponding metallic objects obtained after reduction/sintering (bottom).

FIG. 8 shows three sets of three-dimensional metal oxide green bodies (top) and for each type of metal oxide green body, one of the corresponding metallic objects obtained after reduction/sintering (bottom).

FIG. 9 shows thin printed $Fe_2O_3$ sheets which have been subjected to a variety of deformation steps prior to reduction/sintering including being rolled (A), folded (B and C, the structure C may be folded into a box structure), or cut and bent (D). The origami crane shown in (E) shows that three-dimensional objects having more complexity than the extruded object may be made using such deformation steps.

Figure 10:
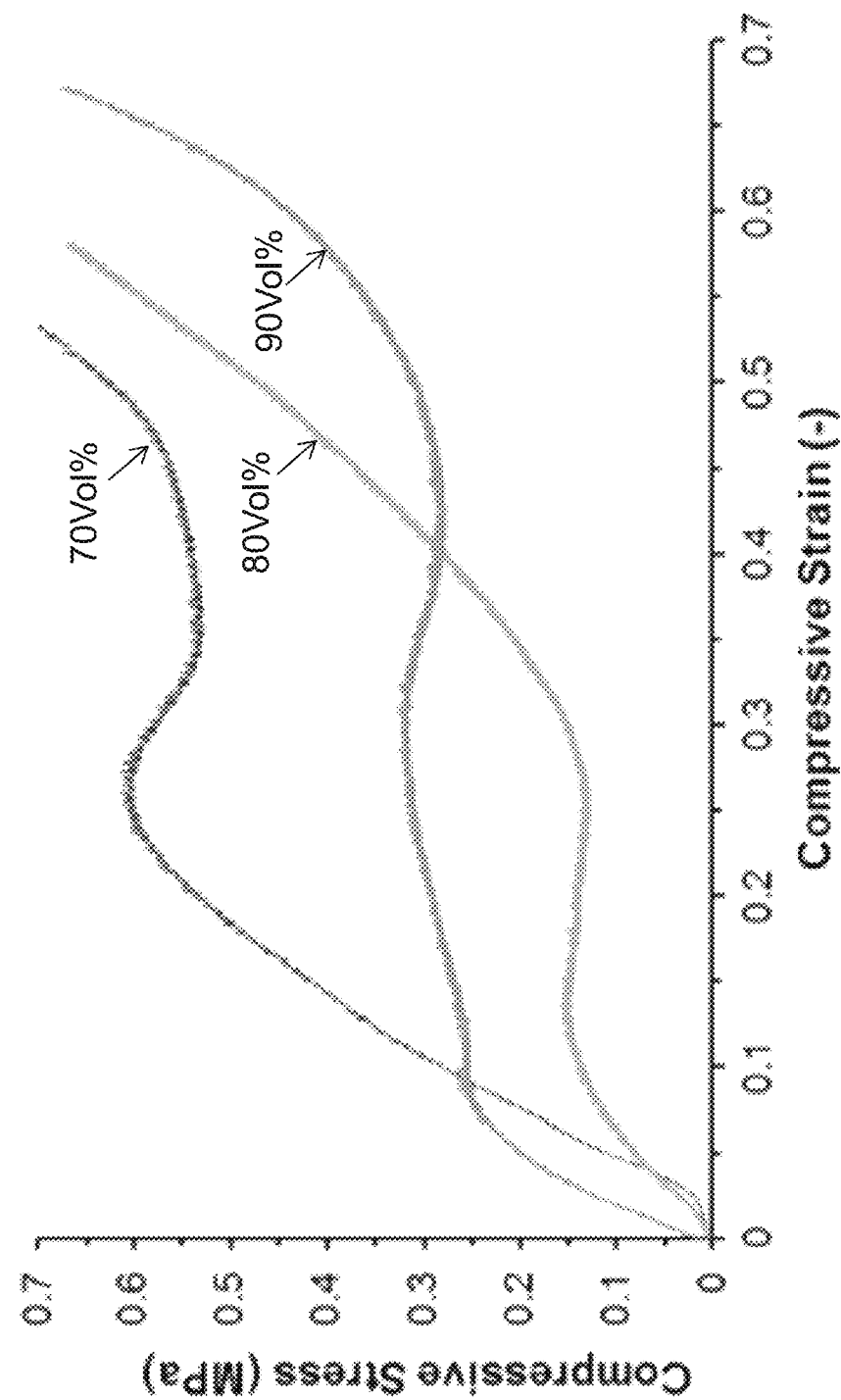
FIG. 10 shows the compressive properties of 70 vol %, 80 vol % and 90 vol % iron oxide green bodies.

FIG. 10 shows the compressive properties of iron oxide green bodies formed from pastes having either 70 vol %, 80 vol % or 90 vol % iron oxide. The compressive properties (long, low stress plateau and high strains) are typical of weak, ductile polymeric materials, despite the fact that the green bodies are primarily composed of the metal oxide powder. Samples which were tested to compressive strains of 0.5 to 0.7 showed ductile "flaring" and barreling, but a lack of catastrophic, brittle failure.

The printed green bodies retained all geometric and architectural features upon transformation to metal, even for the most complex three-dimensional structures. This structural regularity and integrity was verified using scanning electron microscope micrographs. Metallic objects with highly dense struts were obtained. Micrographs of iron metallic objects showed that the struts of the objects were nearly 100% dense (i.e., intra-strut porosity of about 0%) with adjacent neighboring struts sintered together. Pastes with high volume % of metal oxide powders (e.g., 90 vol %) were used to form metallic objects with less shrinkage, i.e., volume reduction, upon reduction/sintering.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of forming a three-dimensional metallic object, the method comprising:

(a) extruding a paste comprising metal oxide particles or non-oxide metal ceramic particles; a polymeric binder; and an organic solvent, through a tip via extrusion-based rapid prototyping, to deposit sequential layers of the paste on a substrate, whereby a three-dimensional metal oxide object or a three-dimensional non-oxide metal ceramic object is formed on the substrate, and (b) exposing the three-dimensional metal oxide object or the three-dimensional non-oxide metal ceramic object to a reducing gas at a temperature and for a period of time sufficient to reduce and to sinter the metal oxide particles or the non-oxide metal ceramic particles, whereby the three-dimensional metallic object is formed, wherein the metal oxide particles and the non-oxide metal ceramic particles are reducible and are reduced by step (b) to form the metal of the three-dimensional metallic object.

2. The method of claim 1, wherein the paste is a metal oxide paste comprising the metal oxide particles, the polymeric binder and the organic solvent.

3. The method of claim 2, wherein the metal oxide particles are iron oxide particles, copper oxide particles, nickel oxide particles, cobalt oxide particles, manganese oxide particles, zinc oxide particles or combinations thereof.

4. The method of claim 2, wherein the polymeric binder is a polymeric binder other than an acrylate-based tri-block copolymer.

5. The method of claim 4, wherein the polymeric binder is selected from polycaprolactone, polylactic-co-glycolic acid, polylactide-co-glycolide or combinations thereof.

6. The method of claim 2, wherein at least six layers of the metal oxide paste are deposited.

7. The method of claim 2, wherein the three-dimensional metal oxide object is subjected to a deformation step comprising bending at least a portion of the three-dimensional metal oxide object to modify the shape of the three-dimensional metal oxide object prior to the exposure step to provide a modified three-dimensional metal oxide object having a bent or curved portion and wherein the three-dimensional metallic object has substantially the same shape as the modified three-dimensional metal oxide object.

8. The method of claim 2, wherein the metal oxide paste is not a colloid.

9. The method of claim 2, wherein the metal oxide paste is formed from a homogeneous suspension of the metal oxide particles coated by the polymeric binder in the organic solvent and wherein the volume % of the metal oxide particles in the homogeneous suspension is in the range of from about 70% to about 90% and the volume % of the polymer binder in the homogeneous suspension is in the range of from about 30% to about 10%.

10. The method of claim 1, wherein the paste is formed from a suspension of the metal oxide particles or the non-oxide metal ceramic particles coated by the polymeric binder in the organic solvent.

11. The method of claim 1, further comprising forming the paste by forming a suspension of the metal oxide particles or the non-oxide metal ceramic particles coated by the polymeric binder in the organic solvent and thickening the suspension by mixing the suspension at a temperature for a period of time sufficient to increase the viscosity of the paste.

12. The method of claim 1, wherein during the extrusion step, a sufficient amount of organic solvent in the paste evaporates such that the three-dimensional metal oxide object or the three-dimensional non-oxide metal ceramic object is self-supporting but a sufficient amount of organic solvent in the paste is retained to achieve merging between adjacent layers of the three-dimensional metal oxide object or the three-dimensional non-oxide metal ceramic object.

13. The method of claim 1, wherein the polymeric binder is polylactic-co-glycolic acid, polylactide-co-glycolide, or a combination thereof.

14. The method of claim 1, wherein the organic solvent is a combination of dichloromethane, 2-butoxyethanol, and dibutyl phthalate.

15. The method of claim 1, wherein the paste is formed from a suspension of the metal oxide particles or the non-oxide metal ceramic particles coated by the polymeric binder in the organic solvent and wherein the volume % of the metal oxide particles or the non-oxide metal ceramic particles in the suspension is in the range of from about 70% to about 90% and the volume % of the polymer binder in the suspension is in the range of from about 30% to about 10%, further wherein the polymeric binder is polylactic-co-glycolic acid, polylactide-co-glycolide, or a combination thereof, and further wherein the organic solvent is a combination of dichloromethane, 2-butoxyethanol, and dibutyl phthalate.

16. The method of claim 1, wherein the paste is formed from a suspension of the metal oxide particles or the non-oxide metal ceramic particles coated by the polymeric binder in the organic solvent, wherein the volume % of the metal oxide particles or the non-oxide metal ceramic particles in the suspension is in the range of from about 70% to about 90% and the volume % of the polymer binder in the suspension is in the range of from about 30% to about 10%, and further wherein the three-dimensional metal oxide object or the three-dimensional non-oxide metal ceramic object formed from the paste does not exhibit catastrophic, brittle failure under a compressive strain of up to about 0.7.

17. The method of claim 16, wherein the three-dimensional metal oxide object or the three-dimensional non-oxide metal ceramic object formed from the paste exhibits a compressive stress of not more than about 0.7 MPa under a compressive strain of up to about 0.5.

18. A method of forming a three-dimensional metallic object, the method comprising:

(a) extruding a metal oxide paste comprising metal oxide particles; a polymeric binder; and an organic solvent, through a tip to deposit sequential layers of the metal oxide paste on a substrate, whereby a three-dimensional metal oxide object is formed on the substrate, and (b) exposing the three-dimensional metal oxide object to a reducing gas at a temperature and for a period of time sufficient to reduce and to sinter the metal oxide particles, whereby the three-dimensional metallic object is formed, wherein the metal oxide paste comprises ceramic particles which are different from the metal oxide particles, and further wherein the ceramic particles are non-reducing ceramic particles.

19. The method of claim 18, wherein the ceramic particles are aluminum oxide particles, yttrium oxide particles, or combinations thereof.

20. The method of claim 18, wherein the metal oxide particles comprise iron oxide particles and the non-reducing ceramic particles comprise aluminum oxide particles and further wherein the step of exposing the three-dimensional metal oxide object to a reducing gas at a temperature and for a period of time sufficient to reduce and to sinter the metal oxide particles comprises exposing the three-dimensional metal oxide object to a reducing gas at a temperature and for a period of time sufficient to reduce and to sinter the iron oxide particles, whereby a three-dimensional metallic object comprising iron and particles of aluminum oxide is formed.

21. A method of forming a three-dimensional metallic object, the method comprising:
   (a) extruding a metal oxide paste comprising metal oxide particles; a polymeric binder; and an organic solvent, through a tip to deposit sequential layers of the metal oxide paste on a substrate, whereby a three-dimensional metal oxide object is formed on the substrate, and
   (b) exposing the three-dimensional metal oxide object to a reducing gas at a temperature and for a period of time sufficient to reduce and to sinter the metal oxide particles, whereby the three-dimensional metallic object is formed,
   the method further comprising forming the metal oxide paste by forming a homogeneous suspension of the metal oxide particles coated by the polymeric binder in the organic solvent and thickening the homogeneous suspension by mixing the suspension at a temperature for a period of time sufficient to achieve a viscosity of about 25 Pa·s for the metal oxide paste.

* * * * *